US008984502B2

(12) United States Patent
Culter

(10) Patent No.: US 8,984,502 B2
(45) Date of Patent: Mar. 17, 2015

(54) SYSTEMS AND METHODS FOR COMPOSING OR DECOMPOSING A COMPOSITE IMAGE FOR FIRMWARE UPDATE IMAGES

(75) Inventor: Bradley Culter, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 13/284,640

(22) Filed: Oct. 28, 2011

(65) Prior Publication Data

US 2013/0111457 A1    May 2, 2013

(51) Int. Cl.
G06F 9/44 (2006.01)
G06F 9/445 (2006.01)

(52) U.S. Cl.
CPC .......................................... G06F 8/65 (2013.01)
USPC .......................................................... 717/171

(58) Field of Classification Search
CPC .............. G96F 8/60; G96F 8/67; G96F 8/68; G96F 8/65; G96F 11/1433; H04L 29/06; H04L 41/082; H04L 45/563; H04L 67/06; H04L 67/1097
USPC .......................................................... 717/171
See application file for complete search history.

(56) References Cited

U.S. PATENT DOCUMENTS

| 6,084,597 | A | * | 7/2000 | Herbstman et al. | 345/630 |
| 7,844,945 | B2 | | 11/2010 | Bhagia et al. | |
| 7,861,119 | B1 | | 12/2010 | Righi et al. | |
| 7,873,959 | B2 | | 1/2011 | Zhu et al. | |
| 2003/0217193 | A1 | * | 11/2003 | Thurston et al. | 709/321 |
| 2005/0097168 | A1 | * | 5/2005 | Mukherjee et al. | 709/204 |
| 2005/0132356 | A1 | * | 6/2005 | Cross et al. | 717/174 |
| 2006/0112235 | A1 | * | 5/2006 | Cabot et al. | 711/141 |
| 2007/0240152 | A1 | * | 10/2007 | Li et al. | 717/174 |
| 2008/0052698 | A1 | * | 2/2008 | Olson et al. | 717/168 |
| 2008/0052699 | A1 | * | 2/2008 | Baker et al. | 717/168 |
| 2009/0094450 | A1 | | 4/2009 | Krzyzanowski et al. | |
| 2010/0180265 | A1 | | 7/2010 | Tsai et al. | |
| 2011/0302567 | A1 | * | 12/2011 | Kobylak et al. | 717/168 |

* cited by examiner

Primary Examiner — Li B Zhen
Assistant Examiner — Hui-Wen Lin
(74) Attorney, Agent, or Firm — Conley Rose, P.C.

(57) ABSTRACT

In at least some embodiments, a computer system comprises a processor, a memory coupled to the processor. The computer system also comprises a network interface coupled to the processor. The memory stores a firmware composition tool that, when executed by the processor, is to build a composite image comprising an arbitrary number of firmware update images according to a set of format rules that enables a self-describing aggregation of the arbitrary number of firmware update images.

20 Claims, 6 Drawing Sheets

SYSTEMS AND METHODS FOR COMPOSING OR DECOMPOSING A COMPOSITE IMAGE FOR FIRMWARE UPDATE IMAGES

BACKGROUND

Computer systems are never perfect. As they mature, defects in intended function are discovered and repaired through updates in the behavior of one or more firmware and/or software components within the computer systems. The updates needed for firmware components pass through a development stage, a deployment stage, and an installation stage. In the development stage, firmware updates are often developed in a manner that is not aligned with other such updates. After the development stage, the deployment stage is needed to provide developed updates to their destinations. In the installation stage, updates are carefully orchestrated within the customer's operating environment and customers tend to perform all pending updates at one time.

Some efforts have been made to organize firmware updates by requiring every code component to be deployed with an executable binary written to specific operating contexts (e.g., Windows® or Linux® operating systems) and by maintaining a database with operating context dependencies. However, the complexity and cost of these practices is ever increasing and is limited to specific computer systems. Further, while each product usually ships with the necessary hardware and software to perform firmware updates, product specific procedures are used and the complexity level for customers and firmware update developers is undesirable.

BRIEF DESCRIPTION OF THE DRAWINGS

For a detailed description of illustrative examples, reference will now be made to the accompanying drawings in which.

NOTATION AND NOMENCLATURE

Figure 1:
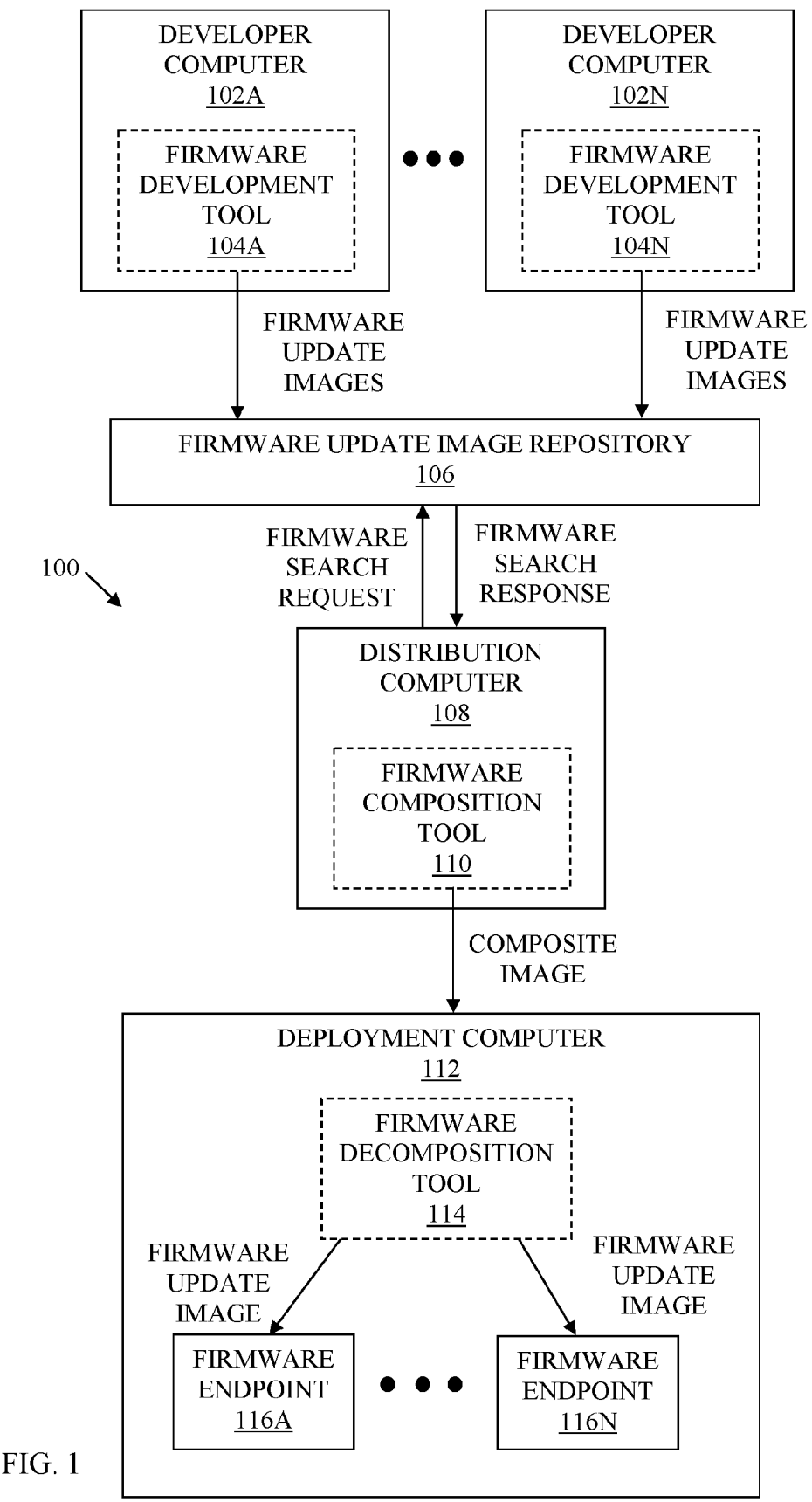
FIG. 1 shows a system in accordance with various examples of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Embodiments of the disclosure are directed to development, deployment, and installation of firmware update images based on a composite image framework or set of format rules to support a self-describing aggregation of an arbitrary (random) number of firmware update images. The composite image framework provides a solution to a difficult set of related problems related to performing firmware updates of components within computer, storage and networking systems while the systems or portions thereof are still in use. The disclosed composite image framework distributes the logic for validating guard conditions arising from component dependencies to the lowest level possible, represented in both data as well as executable code, and in a binary format compatible with arbitrary ROM image footprints, regardless of instruction set. Although complex, the composite image framework addresses a number of problems directly instead of making compromises.

The disclosed composite image framework solves a number of related problems and contributes improvements to existing solutions in the problem domain of providing firmware updates to computer system products under warranty (in the field). The solution is based on combining four techniques in a whole system approach that addresses three separate types of operating contexts, which may be geographically dispersed. The three contexts are: 1) development of the firmware components that will be used to update a product; 2) deploying the components in the supply and services chains; and 3) installing the components at the customer site in the system. The five combined solution techniques in the disclosed framework are: 1) inverting the dependency checks of the update process so they are distributed to the lowest possible level; 2) factoring decision logic into separate data and code; 3) using an embedded environment execution-compatible image binary; 4) using a self-describing nested composite format in every context; and 5) the specific structure of the file format itself minimizes freedom to vary (information loss and distortion) while also maximizing freedom of action in groups that use the disclosed composite image framework.

The disclosed composite image framework improves or resolved various issues related to the development, deployment, and installation of firmware updates including, but not limited, to: 1) the inability for product field support groups to create their own combinations of firmware update images without research and development; 2) the difficulty in validating image integrity of different types of firmware update images; 3) the cost of creating and handling update dependency information; 4) the dependence on a functioning server with specific operating context to host the update files and the need to customize update tool for every component; 5) the complexity of the firmware update process when the update target is capable of "pulling" data instead of depending on a "push from server" model; 6) the cost of maintaining and using a dependency database outside of the development teams and platforms where the dependencies are born; 7) the inability to easily determine dependencies for a given combination of firmware update images or candidate combination of firmware update images; and 8) the difficulty or infeasibility of updating a firmware image by a processor other than the one executing the new firmware.

The disclosed composite image framework provides the various benefits to the development, deployment, and installation of firmware updates including, but not limited, to: 1) reducing costs of development and maintenance of tools that produce, handle and install firmware updates; 2) reducing costs of composing separately developed firmware components; 3) the composite image framework allows firmware that performs updates to be validated before using it to update its component; 4) the composite image framework allows an external processor to update the image of a processor whose current image is corrupt without having to know any chip specific file format (only memory access and composite image parsing is needed); 5) the composite image framework can be decomposed and recomposed after the fact to create new combinations of firmware update images from released components using simple tools and no database; and 6) using the same composite image framework for read-only memory (ROM) and disk distribution simplifies a number of engineering and development tasks reducing cost.

FIG. 1 shows a system 100 in accordance with at least some embodiments of the disclosure. As shown, the system 100 comprises a plurality of developer computers 102A-102N with corresponding firmware development tools 104A-104N. Although not required, the developer computers 102A-102N may be located in different geographic locations and may be related to different groups of developers responsible for providing firmware updates. Over time, the developer computers 102A-102N employ the firmware development tools 104A-104N to develop firmware update images. In at least some embodiments, firmware updates images developed by the developer computers 102A-102N, while executing the firmware development tools 104A-104N, are stored to a firmware update image repository 106.

As needed, the firmware update image repository 106 is able to respond to different firmware search requests with an appropriate firmware search response. For example, a firmware search request may specify a particular product identifier, one or more firmware component identifiers, or other identifiers to request firmware update images. As shown in FIG. 1, a firmware search request may be initiated by a distribution computer 108 that executes a firmware composition tool 110. In at least some embodiments, the firmware composition tool 110 is able to build (package) a composite image of firmware update images according to the composite image framework disclosed herein. The composite image framework (format rules) enables an arbitrary number of firmware update images to be packaged together as a self-describing aggregation of the arbitrary number of firmware update images. Although only one distribution computer 108 is shown, it should be understood that the system 100 could comprise a plurality of distribution computers, each with a firmware composition tool for building composite images.

As shown, a composite image output from the firmware composition tool 110 is received by a deployment computer 112 with a firmware decomposition tool 114. The firmware decomposition tool 114 is able to decompose composite images based on the same format rules that were used to build the composite image. After decomposition, individual firmware update images are made available to firmware endpoints 116A-116N. Although only one deployment computer 112 is shown, it should be understood that the system 100 could comprise a plurality of deployment computers, each with a firmware decomposition tool for unpacking and deploying received composite images to firmware endpoints.

In accordance with at least some embodiments, each composite image output from the firmware composition tool 110 has a predetermined format including: 1) a single table of contents; and 2) at least one firmware image payload. Briefly, the table of contents comprises a single header and at least one entry. The table of contents of a composite image is aligned with at least one firmware image payload at a predetermined byte-aligned offset such as 1024 bytes. The header of a composite image may comprise fields such as a signature field, a composite image (CI) version field, a header length field, a number of entries field, a nesting level field, a TOC_CRC (Table of Contents Cyclic Redundancy Check) field, and a description field. Further, each entry may comprise an entry length field, a payload tag field, a data format field, a payload CRC (Cyclic Redundancy Check) payload length field, a payload offset field, a payload version field, and a payload description field. In at least some embodiments, the first entry following the header describes the entire composite image. More information regarding the format rules for a composite image are given hereafter in FIGS. 4A and 4B the modular storage array example provided after the figures. With knowledge of these specific format rules, the firmware decomposition tool 114 is able to decompose or unpackage a composite image as disclosed herein.

Although FIG. 1 shows use of a composite image to update firmware, it is also possible to use a composite image to deploy firmware images for the first time (not as an update). For example, in the factory, an unprogrammed device may be directly programmed via a special system, referred to as an ICT (in circuit tester) because the firmware images cannot program or reprogram themselves yet. In this scenario, a composite image could be used to deploy firmware images for the first time. The factory software could read the TOC, extract the self-describing components and copy the binary data directly to the firmware endpoints being programmed.

Figure 2:
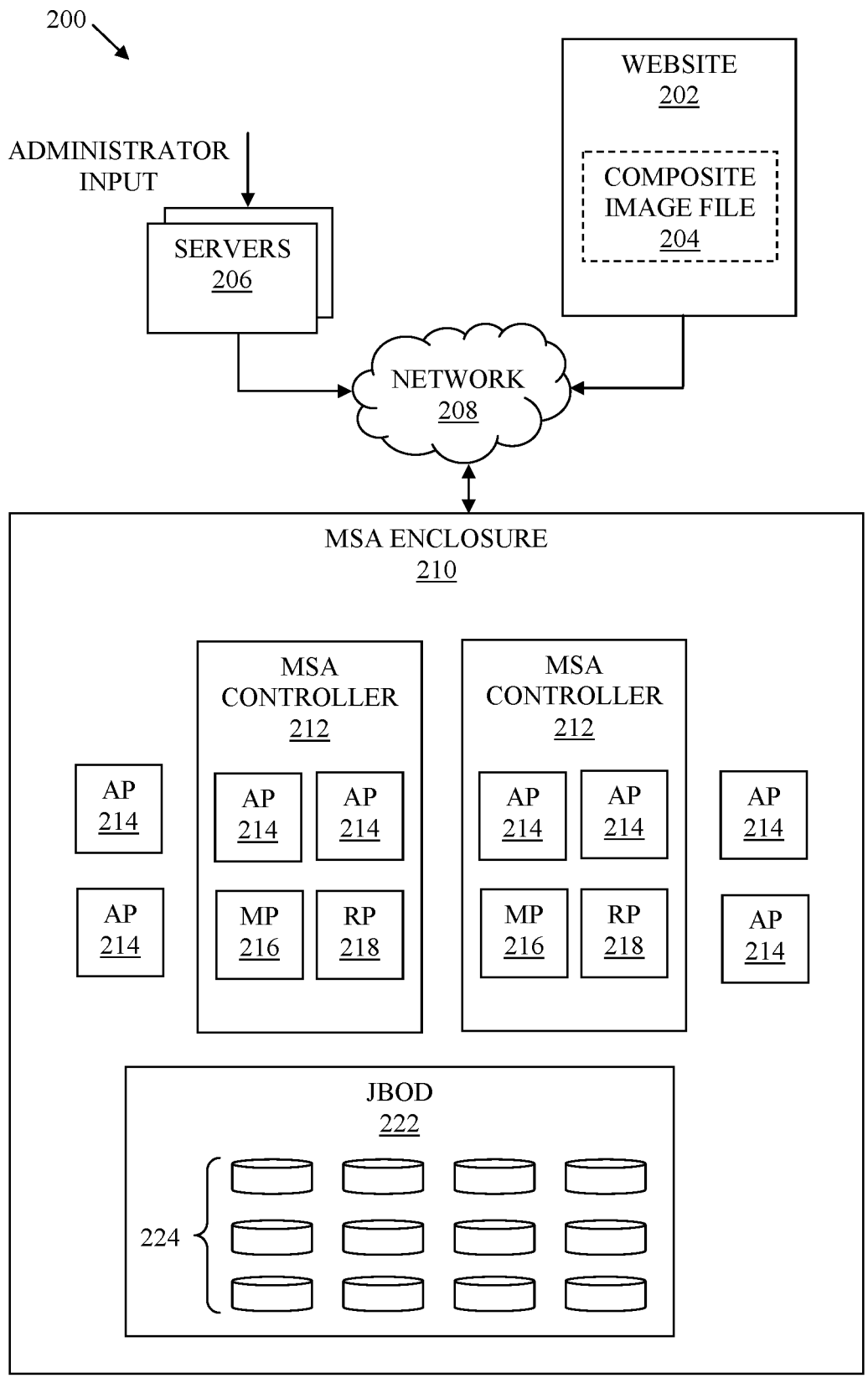
FIG. 2 shows another system in accordance with various examples of the disclosure.

FIG. 2 shows another system 200 in accordance with at least some embodiments of the disclosure. In FIG. 2, the system 200 comprises a modular storage array (MSA) enclosure 210 in communication with a website 202 and servers 206 via a network 208. As shown, the website 202 comprises a composite image file 204, which may be built for deployment to the MSA enclosure 210. For example, the composite image file 204 may be built in response to administrator input to servers 206 in communication with the website 202 and the MSA enclosure 210. Further, the timing of the deployment of the composite image file 204 to the MSA enclosure 210 may be determined based on administrator input to servers 206. The administrator may correspond, for example, to a firmware developer or to a deployment administrator responsible for distribution of firmware update images to products such as the MSA enclosure 210.

In FIG. 2, the MSA enclosure 210 comprises various components that use firmware. More specifically, the MSA enclosure 210 comprises a JBOD (just a bunch of disks) unit 222 with disks 224. To support the JBOD unit 222 and other operations, the MSA enclosure comprises MSA controllers 212 with auxiliary processors 214, enclosure management processors 216, and RAID storage processors 218. The MSA enclosure 210 also comprises additional auxiliary processors 214 external to the MSA controllers 212. Periodically or as needed, firmware update images are developed for the various processors of the MSA enclosure 210. These firmware update images may be packaged together as a composite image file (e.g., composite image file 204) to facilitate distribution and deployment of firmware update images to firmware endpoints (e.g., the auxiliary processors 214, the enclosure management processors 216 and/or the RAID storage processors 218) of the MSA enclosure 210.

Figure 3:
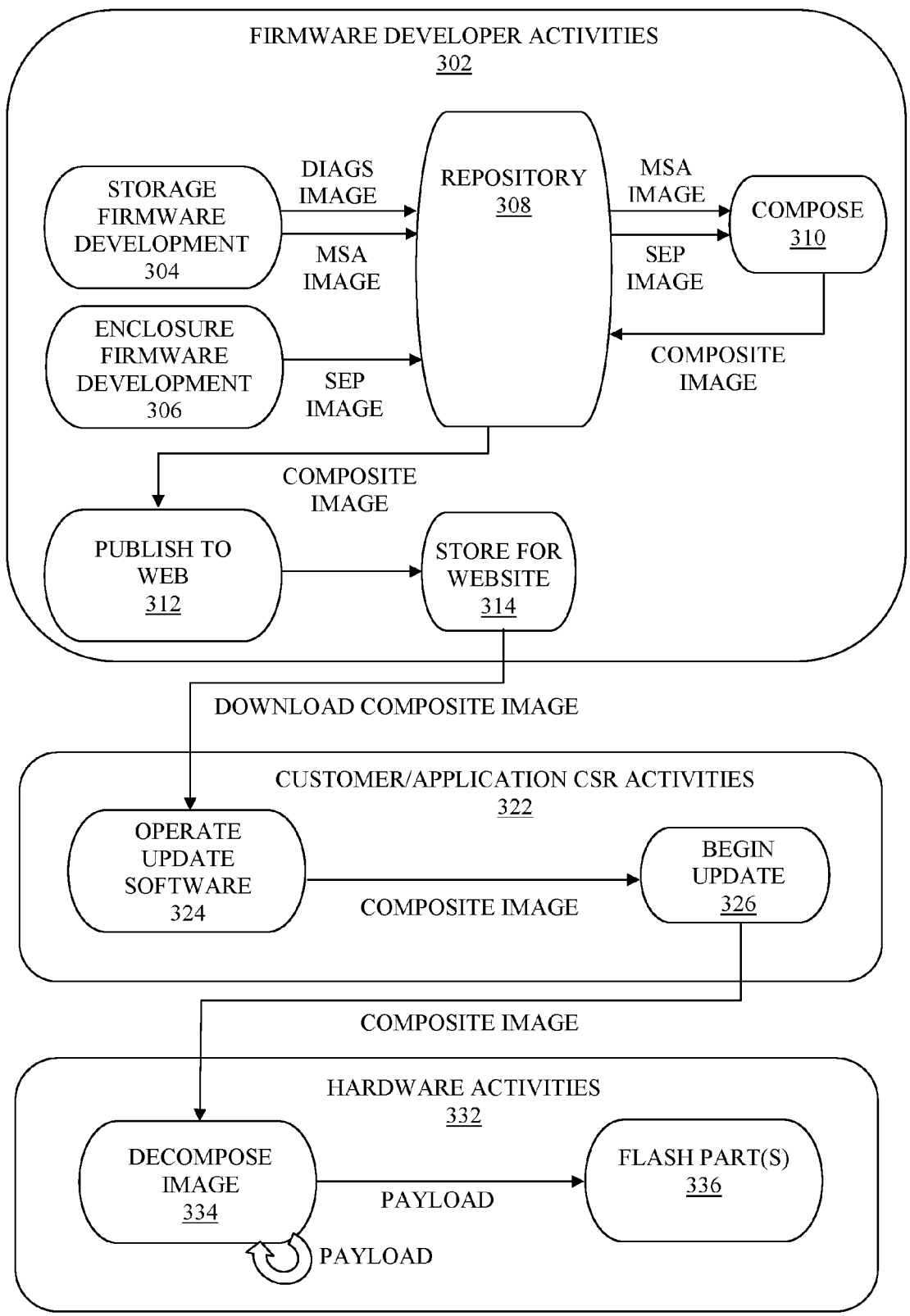
FIG. 3 shows different activities related to firmware updates in accordance with various examples of the disclosure.

FIG. 3 shows different activities related to firmware updates in accordance with at least some embodiments of the disclosure. In FIG. 3, the firmware developer activities 302 include storage firmware development 304 and enclosure firmware development 306. The resulting diagnostics (DIAGS) images, MSA images, and storage enclosure processor (SEP) images from steps 304 and 306 are stored in repository 308. Sometimes a designer will implement two different firmware images for a system. One image is the normal functioning version of the firmware that is used by customers in normal operation. The second image is an enhanced set of functionality (a DIAGS image) that can perform functions that are sometimes harmful to performance but provide forensic information or perform error injection tests. The second image also may emit results of these tests or log them for later recovery by other tools. Although both firmware images may be programmed into FLASH memory, these images may sometimes be individually updated. To select which one is going to be used often occurs at power-on time, and requires an external signal, such as a voltage on a test pin or button being pressed at the time power is applied. This is not something customers do but could be done in the factory after programming a firmware endpoint for the first time in order to test the new assembly. The selection of the second image with enhanced functionality may be done in the field by a service technician who has access to the system when the system is offline for scheduled service (so the tests are not intrusive to operations). Some firmware systems implement diagnostics functions as alternate features of the standard firmware image—so they are available while the system is in otherwise normal operation. Use of DIAGS images is not required in the disclosed composite image framework but the framework would easily support use of composite images that combine NORMAL images and DIAGS images or composite images that separate NORMAL images and DIAGS images prepared by developers for a single device.

The content of the repository 308 is accessed as needed for compose step 310 to compose or build at least one composite image, which may be stored in repository 308 or another location. Once a composite image has been built by compose step 310 and has been stored in repository 308, that composite image may be published and stored for a website at steps 312 and 314.

FIG. 3 also shows various customer self repair (CSR) or other application activities 322. More specifically, a composite image previously stored to a website at step 314, may be downloaded in response to an operate update software step 324, which causes a begin update step 326 to occur. The begin update step 326 causes the composite image downloaded at step 324 to be received by hardware that performs hardware activities 332, including a decompose image step 334 to extract firmware update image payloads and a flash part(s) step 336 to flash at least one firmware part.

Figure 4:
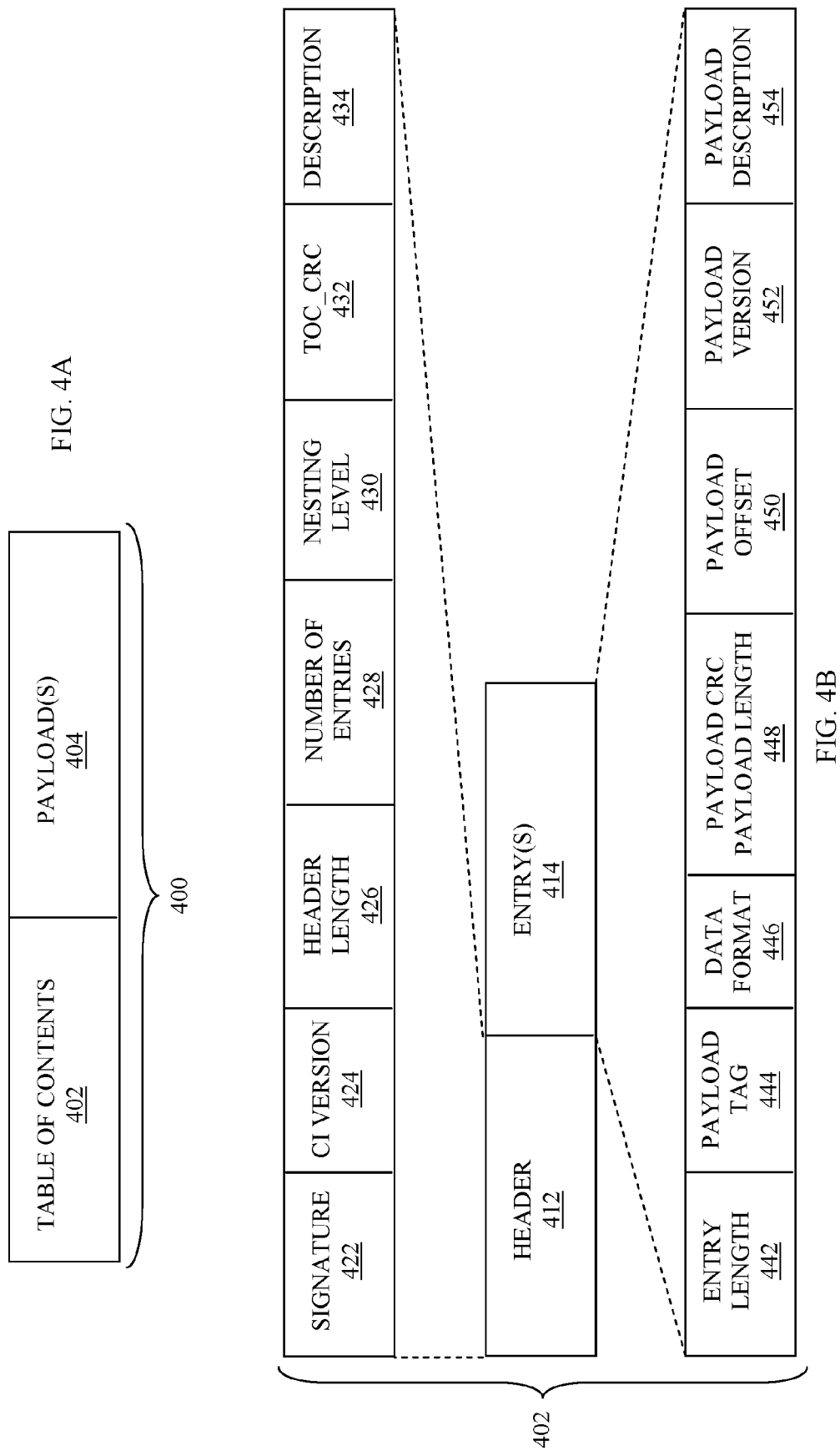
FIGS. 4A and 4B show a composite image file format in accordance with various examples of the disclosure.

FIGS. 4A and 4B show a composite image file format in accordance with at least some embodiments of the disclosure. In FIG. 4A, a composite image file 400 is shown to comprise a table of contents 402 and at least one payload 404. The table of contents 402 is shown in further detail in FIG. 4B. More specifically, the table of contents 402 comprises a header 412, and at least one entry 414. The header 412 may comprise fields such as a signature field 422, a composite image (CI) version field 424, a header length field 426, a number of entries field 428, a nesting level field 430, a TOC_CRC (Table of Contents Cyclic Redundancy Check) field 432, and a description field 434. Meanwhile, each entry 414 may comprise an entry length field 442, a payload tag field 444, a data format field 446, a payload CRC (Cyclic Redundancy Check) payload length field 448, a payload offset field 450, a payload version field 452, and a payload description field 454. Additional details regarding the content of each field is given hereafter.

Figure 5:
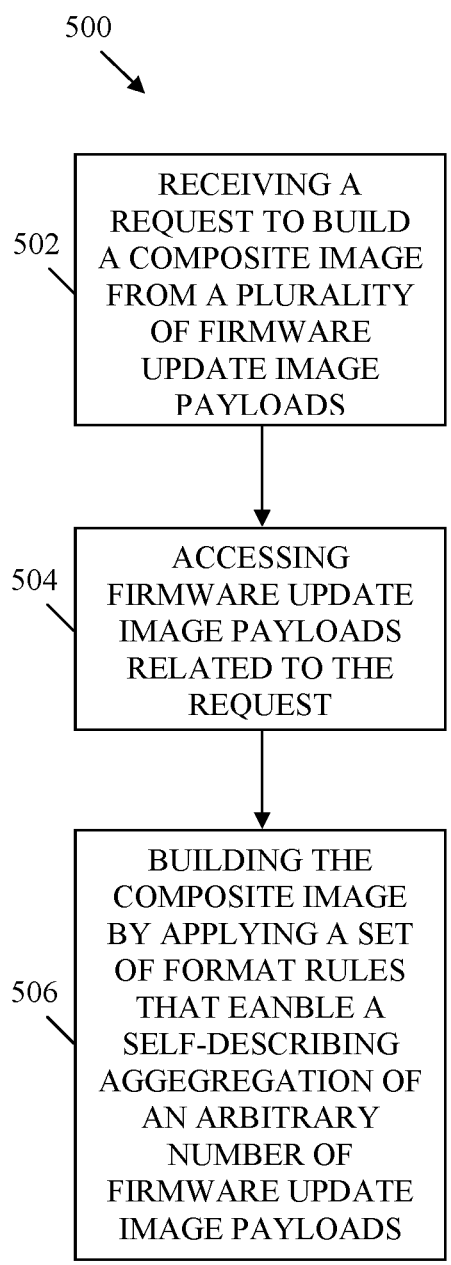
FIG. 5 shows a method for composing a composite image in accordance with various examples of the disclosure.

FIG. 5 shows a method 500 for composing a composite image in accordance with at least some embodiments of the disclosure. The method 500, for example, may be performed by a development computer (e.g., development computers 102A-102N) or a distribution computer (e.g., distribution computer 108). In method 500, a request to build a composite image from a plurality of firmware update image payloads is received (block 502). The firmware update image payloads related to the request are then accessed at block 504. The composite image is built by applying a set of format rules that enable a self-describing aggregation of an arbitrary number of firmware update image payloads at block 506.

Figure 6:
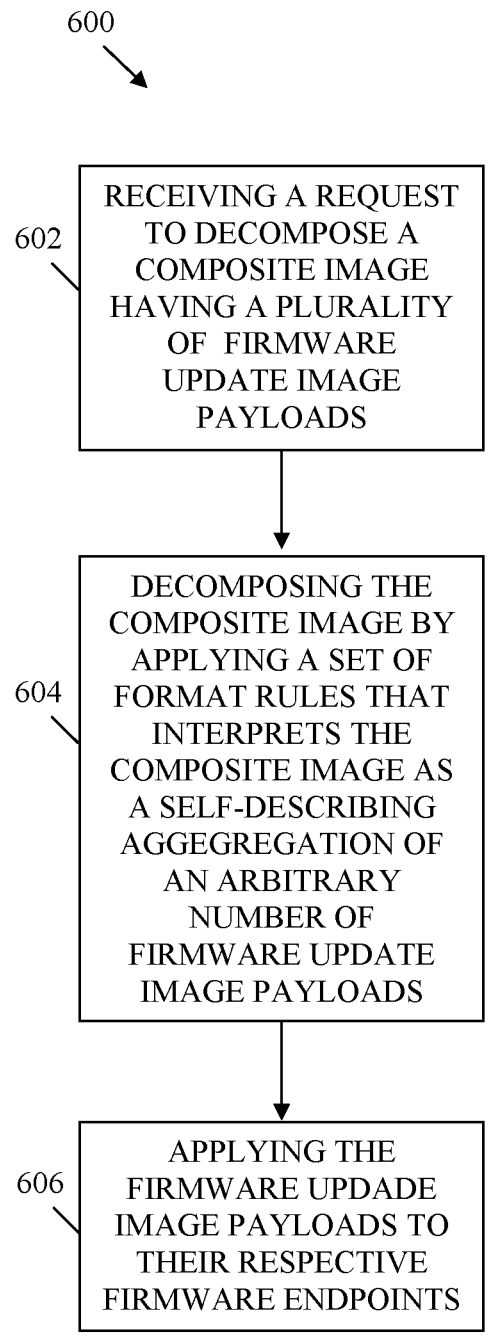
FIG. 6 shows a method for decomposing a composite image in accordance with various examples of the disclosure.

FIG. 6 shows a method 600 for decomposing a composite image in accordance with at least some embodiments of the disclosure. The method 600, for example, may be performed by a deployment computer (e.g., development computer 112). In method 600, a request to decompose a composite image having a plurality of firmware update image payloads is received (block 602). The composite image is then decomposed by applying a set of format rules that interprets the composite image as a self-describing aggregation of an arbitrary number of firmware update image payloads at block 604. The firmware update image payloads are then applied to their respective firmware endpoints at block 606.

Figure 7:
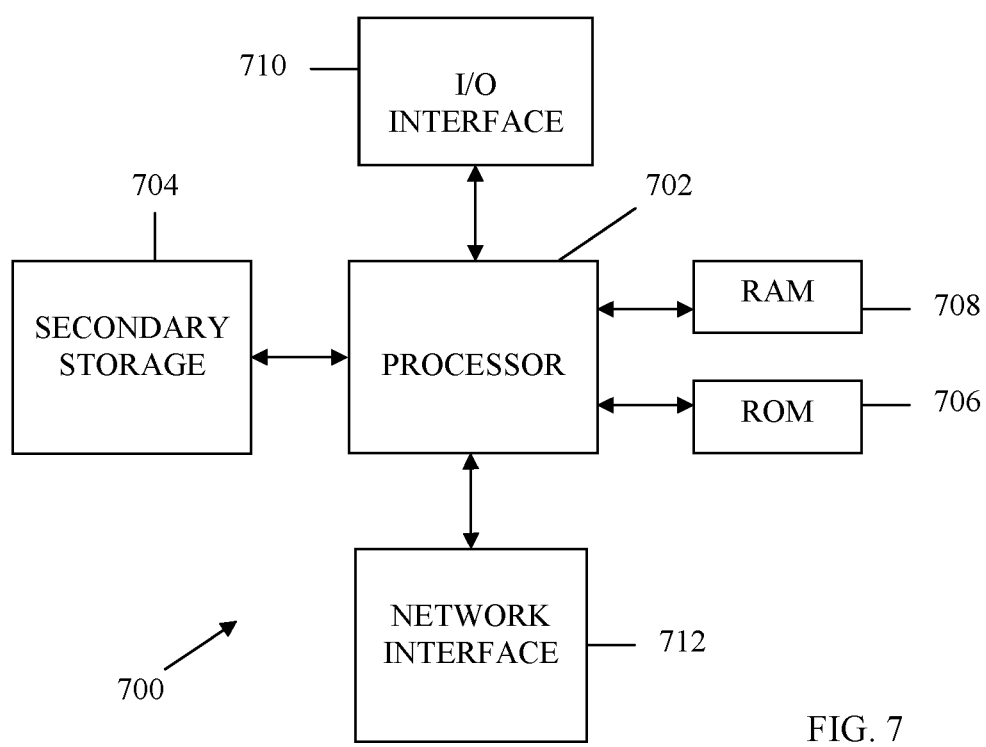
FIG. 7 shows a computer system in accordance with various examples of the disclosure.

The composite image framework and its employment to facilitate development, deployment and installation of firmware update image payloads as described above may be implemented with any general-purpose computing component, such as an application-specific integrated chip (ASIC), a computer, or a network component with sufficient processing power, memory resources, and network throughput capability to handle the necessary workload placed upon it. FIG. 7 illustrates a typical, general-purpose computer system 700 suitable for implementing one or more embodiments of the components disclosed herein. The computer system 700 includes a processor 702 (which may be referred to as a central processor unit or CPU) that is in communication with memory devices including secondary storage 704, read only memory (ROM) 706, and random access memory (RAM) 708, with an input/output (I/O) interface 710, and with a network interface 712. The processor 702 may be implemented as one or more CPU chips, or may be part of one or more application specific integrated circuits (ASICs).

The secondary storage 704 is typically comprised of one or more disk drives, flash devices, or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

A detailed example of applying a composite image framework or format rules to an MSA enclosure is given herein to illustrate various aspects of the disclosed composite image framework. However, embodiments are not limited to composite image use for MSA enclosures. Rather, the composite image framework provides an efficient mechanism for development, deployment, and installation of arbitrary aggregations of firmware update image payloads for any product with multiple firmware endpoints.

In some examples, the composite image for an MSA enclosure may be referred to hereafter as an MSA composite image and is released as Customer Self-Repair (CSR) firmware for MSA products to the world-wide-web. Although the focus of the disclosure is the format of the composite image itself, some context is also provided to show the rationale for the choices embodied in the disclosed composite image framework.

As used, herein the adjective "composite" is used to signify a released firmware file that contains a collection of all of the various firmware images (code and data) that must be programmed into an MSA storage system for correct operation. In the visual modeling language, UML, such a collection is formally called a "composite."

The purpose of the composite image framework is to help satisfy the CSR of controller firmware (not disk drive) updates. Various assumptions are made in determining the structure of the disclosed composite image framework. First, no changes in the current storage enclosure processor (SEP) image design or implementation are needed. Its format will become part of the new composite image format and the process for its creation can/should remain the same. In at least some embodiments, the composite image framework will be a revision/extension of the existing SEP Flash spec or will include it by reference.

As discussed in the process section above, the composite image framework implies that there should be no policy assumptions or coupling of policy between or among the software that produces, handles and consumes composite firmware images. Systems that have assumptions can only interoperate if all of the assumptions never change. But since they are assumptions, they are hidden from each subsystem, and are developed by different teams, which naturally evolve each subsystem. Thus interoperability will eventually deteriorate. The composite image framework therefore attempts to remove all assumptions. For example, the assumption in software that there is only one enclosure processor and one raid processor per controller that needs firmware is broken as soon as a hardware design exists in which both the enclosure processor and the RAID processor are one and the same. Many other examples abound.

The composite image framework is also free from assumptions regarding any types of policy whose enforcement belong to different subsystems or domains. For example, a validation policy that requires firmware executing in the controller to be applied to prevent invalid images from being reflashed is a policy that ultimately belongs to the firmware—not to the software or the customer running that software. Attempts to move this policy to higher level parts of the system in order to prevent inadvertent reflashing from losing system integrity have been suggested. These ideas are well-intentioned but misguided. Fundamentally, the firmware itself is responsible for its own integrity because it is the only entity that can actually know if it possesses such integrity. All other ideas about whether an image is valid for a particular hardware component are at best hints, because low level details of hardware, such as processor silicon revision level are opaque to all other entities. These are only accessible by firmware actually executing within the processor. That is the firmware that must validate whether an image will operate or not if it were to be reflashed into that processor just before it attempts to do so.

Thus various image design choices have been intentionally omitted from the composite image framework. Some policies to be considered for the process of updating firmware include: 1) validation policy—that the image can operate in the target hardware; 2) intent policy (what a user intends to do with the system); 3) constraint policy (what rules governing sequences of multiple, dependent and independent firmware components within the same hardware system); 4) policy enforcement (what entities are responsible for enforcing various policies); 5) policy visibility (what the visibility of the various policies are to the end user (opaque or transparent or both?)); 6) policy conflict resolution (what are the policies about policy conflicts?); and 7) policy violation behavior (what are the policies governing an actual policy violation that occurs in the system?).

The disclosed composite image focuses on defining a firmware image aggregation mechanism that will operate within many different policy networks. It does so by excluding all of these policy aspects save the one that presumes the firmware in the system is responsible for reprogramming itself and must therefore, know how to parse a composite image so it may extract its next version from an aggregate that is passed to it by the outside world, where aggregations are expected to be created by different composing tools. Thus, it is conceivable that a nested composite image might be created by a tool that is using an older version of the specification than some of the sub-images were composed with. This possibility is intentionally supported by specifying a length field in the invariant portion of both critical data structures: the TOC header and a TOC entry.

In accordance with some examples, the disclosed composite image framework employs container-level integrity by providing for an integrity check over each composite image. This feature ensures that the composite image is not corrupted. Further, the composite image framework employs a mechanism to ensure that the entity that composes a composite image can reliably decompose it. This mechanism is essentially a handshake of the build-time composing process with the run-time decomposing process that ensures the decomposing process recognizes a composition that it knows how to handle and doesn't recognize one that it isn't supposed to handle. Further, the composite image framework supports nested compositions (also called sets of sets), wherein the set relation is strict-subset, and not set intersection. The composite image is a linear stream of bytes (a file) so it must be possible to unambiguously recover the hierarchical structure if nested compositions are present in the file. In other words, the table of contents (TOC) for one payload must never be mistaken as the TOC for another payload simply because one is closer to the beginning of the file than the other.

The composite image framework may also provide an integrity check over each component image within a composite image. This feature ensures that each component can be handled independently from other components and any composition and that its integrity can be validated independently of these other images or sub-images so that any process defect (in the chain of composition or decomposition) is more easily diagnosable. Since separate development centers and tools are involved, separate evolution of these tools increases the chance of defects occurring. This requirement helps discover where the process breakdown occurred because it enables a composite checker analysis tool to automate the diagnosis.

The composite image framework may also permit one or more individual images or payloads to be absent from a composite image that would normally contain them. This feature supports the use case of performing an update of individual firmware update image payloads of a previously released composite image. For example, if a composite image is released that contained only one sub-component, the composite image framework should support such an image.

The table of contents (TOC) of a composite image may provide sufficient information to enable the contents of TOC to be displayed in a human readable fashion. Further, the TOC is position-independent within the composite image. More specifically, the TOC is not required to be at the beginning (lowest address offset) of a composite image file. In this manner, native ROM payloads that require the first bytes of an image to be executable code are supported. The Ventura Expander/SEP firmware image is an example of a system that requires its TOC to be at the end of a file. The composite image framework is also compatible with SEP Image Compatible constraints to enable use of an existing SEP firmware image (which is an aggregation that contains expander firmware along with various microcontroller programs) within a composite image. If an SEP image is composed using this format, the sub-components of the SEP image could then be inventoried by any application that knows how to parse a composite image file.

The composition of a payload (whether it be uninterpreted binary data or another composite image) may prevent modification of the payload bits. Reading these bits is allowed, but not their modification. Further, the file image format shall have a structure that can be efficiently parsed by firmware executing out of ROM when the image is also stored in ROM, particularly serially-accessed ROM. In this manner, the composite image framework is hardware friendly in the sense that the in-ROM format can be identical to the on-disk format to simplify flashing requirements. Also, the decomposition in ROM should execute as quickly as possible to minimize the time the customer has to wait for the firmware to be reprogrammed.

The composite image framework also supports the extraction of a nested composite image which was composed using a newer format version from an enclosing composite image that is built with an older version of the tool and vice-versa. In this manner, older extraction tools do not have to be able to correctly parse all of a new-format composite image, but they should be able to skip over these newer sub-images with 100% reliability to locate those image formats that they do fully recognize.

In at least some examples, the composite image framework supports the existing (unmodified) SEP image format as a native image payload. The current SEP image format is already deployed and functions so no changes are currently needed. Accordingly, the composite image framework supports aggregating an existing SEP image into the new composite image format. The only limit is that because the SEP is a native image, its internal composition will not be visible to software that can decompose other composites that do employ composite image framework. The SEP will look like a "leaf" payload instead of the aggregation that it actually is.

As disclosed herein, the composite image framework may employ a file format that is self-describing. A standard, self-describing firmware image format supports lower-cost development by decoupling various parts of the system that deliver the customer experience of CSR firmware update. Such tools can evolve independently of one another yet still interoperate. Self-description can support both programmatic and human understanding of the file contents.

Mechanisms for building payloads which may be native image format or may be in composite image format shall be independent of one another. This is because source trees and compilers are different for each intelligent subsystem within an enclosure. For example, a command line tool named "compose" or "comp" that is driven by makefiles and takes arguments from the makefile (or a script named by the makefile) may be employed to build a composite image. This tool should be useable in all of the build environments.

With the composite image framework, the customer experience of updating MSA system firmware is simplified. Since each MSA system contains several, separately built firmware binaries that are loaded into different hardware components, updating them all could be supported for CSR in very complex ways.

The composite image framework may permit forming a composite image with one or more of the normally present payloads removed. In such subsets, there will be no evidence of the removed payloads (i.e., no empty directory entries are left in the TOC). The build tools for composite images have no hard-coded assumptions of what constitutes a valid composition. Rather, the build tools should accept input driven by the makefile that builds the firmware itself. Whether the makefile uses a control script or takes command line inputs from Make invocations is a design detail left to the implementers.

In some examples, the update software and the firmware that decomposes a composite image and is responsible for reprogramming one or more payloads into the hardware is able to perform partial updates, unless doing so violates system integrity checks. The decomposition software makes no assumptions about the contents of a composite image or payload that prevents it from being able to perform updates of fewer than all of the firmware update image payloads in a composite image. The firmware (and software) that decomposes a subset composite image enables partial updates to be correctly performed. The decomposition software does not impose any policy that forbids the intent expressed by the mere existence of a formally released Subset composite image. For example, a subset composite image may be a formally released composite image with fewer firmware update image payloads that is overlaid onto a system which has previously had a more complete composite image programmed into it.

In at least some embodiments, the composite image framework is compatible with the ISS Matrix system and process for production and publication of firmware. In other words, the composite image framework model does not impose requirements concerning version numbers and file names. Use of the ISS Matrix system facilitates management of the firmware built, composed and released using the composite image framework. The ISS Matrix system does not care about the internal format of files it manages so any structure can be imposed for storage and later access.

In some examples, the composite image framework supports disk drive updates. Using the same image format for flashing drives as well as controllers would support aggregating all of the drive firmware images that are supported by a controller with a validated firmware recipe. Drive firmware releases may be under the control of the drive team who has the ownership authority for those requirements. Accordingly, the composite image framework allows drive images to be aggregated as payloads if desired, so there is some compatibility even with drive firmware images stored in 'native' format. However, adopting the drive firmware release format and process recently introduced with the EVA program, which involves a standardized file format under control of the drive team, may be beneficial.

The composite image framework may also contain a mechanism to support dependencies flashing. If one firmware component needs to be updated before another, the description should contain that information. The reason for this is to allow the update application tools to parse the file and discover the correct order of flashing before beginning the process. This capability mixes complex issues of behavioral policy with static descriptive functions.

In some examples, the composite image framework has a mechanism to support pre-requisite validation. If a component requires a base level of firmware to be already installed on the system, the update application can prevent the component from being flashed if it does not already contain that level. This capability mixes complex issues of behavioral policy with static descriptive functions.

The composite image framework may also support localization of any text strings in its description fields. This would allow inventory functions to present descriptive strings in the native language of the customer. Localization is supported, for example, by the software flash tools which execute within OS environments that provide facilities to make language localization much less costly.

In some examples, the composite image framework supports composite images larger than 4 GB in size. Although ROM images of this size are not currently anticipated, support for large images ensures changes to the composite image framework should not be needed. Further, 32 bit operations may not be large enough to ensure a durable specification, but 64 bits operation should be.

The composite image framework is intended to support arbitrary aggregations of firmware. This framework also supports self-describing aggregations of aggregations. The composite image framework is a very general model that tries to avoid any implicit assumptions in a direct attempt to create a durable specification. This framework is designed to support single level as well as nested aggregation. It also is intended to support disaggregation by update software tools for the purpose of inventory without the tool having any a priori knowledge of the aggregates.

To describe the composite image framework, various terms are described herein. A "bytestream" is an aggregation of zero to many contiguous bytes. An "entry" is a type of bytestream. A "payload" is a type of bytestream. A "composite image" is a type of payload and is a container that is composed of exactly one table of contents and one to many payloads. A "table of contents" is a container that is composed of exactly one header and one to many entries. In at least some embodiments, the table of contents is aligned within the composite image data on a 1024-byte0aligned offset. A "header" is a container composed of exactly one of each of: a signature, a composite image version, a header length, a number of entries, a nesting level, a table of contents (TOC)_CRC, a and a description field. One entry describes the contents of one payload. An "entry" is a container composed of exactly one of each of the following: an entry length, a payload tag, a data format, a payload CRC payload length, a payload offset, a payload version, and payload description. All entries in a table of contents are contiguous. The header precedes and is contiguous to the first entry in a table of contents. Together, the header and the first entry in the table of contents describes the entire composite image (i.e., the first entry is always present and always describes the entire image as a payload). The TOC_CRC protects (is calculated over) the contents of the table of contents. Each payload CRC is calculated only over the payload data bytes it protects. There are exactly as many entries in the table of contents as there are payloads. Since the entire composite image is a type of payload, the smallest number of entries is 1; a null composite image that contains only a table of contents and no other {entry, payload} pairs still contains one entry. Because a composite image is a specific instance of a payload, this model implies that a composite image can contain nested composite images (another way of showing nesting is to show a recursive composition association on the composite image itself).

There are only two important data structures to the composite image framework: the header and the entry. The table of contents (TOC) is simply a concatenation of these two structures. All integer data is stored in so-called Big-Endian order. 7-bit ASCII encoding is used for text strings which are NUL-terminated and unused bytes are padded with NUL to the end of the string field in the record. In at least some embodiments, the CRC employed is CRC-32-IEEE, which is used for Ethernet, FDDI, ZIP and other archive formats whose normal (big-endian) polynomial is 0x04C11DB7. This CRC is the one used in the current firmware images. The disclosed fields will not be moved or sizes changed in any future versions of the composite image framework. Any new fields added to the header may be placed following the last byte of the description field and the headerlength value adjusted appropriately. In this manner, older parsers can safely skip over any newer images within a mixed version aggregation.

The header identifies and partially describes a composite image. It contains a signature field (16 byte GUID string) as its first field which serves as a synchronization bit string for locating the beginning of a TOC which may exist within a file at an arbitrary file offset. Descriptive attributes (about the composite image) which are not covered by contents of the first TOC Entry, include the version that identifies the version of the composite image specification this image conforms to, the length of the header structure, the nesting level of the aggregation described by this TOC, the number of payloads within the image, a CRC that is computed over the TOC (not payload) bytes, and an optional description. The purpose of the CRC in the header is to guarantee that raw data bytes within a file will never be mistaken as the signature of a composite image even if they happen to fall on the 1024-byte address boundary within the file. The purpose of the level within the header is to allow files that contain composites of composites whose internal layout may or may not require a native ROM format payload resulting in the TOC being placed at the end, rather than the beginning of a set of payloads (e.g., the SEP firmware employs such a layout).

A C-language representation of the header structure of a composite image is shown below.

ci_header in C
```
struct ci_header {              // aligned on multiple of 1024 //bytes
    U8  Signature[16];          // BD4DF70F-E891-4acd-BD8C-
                                //B15209D1E671
    U8  Version[16];            // "1.0" for this version of CI
    U32 HeaderLength;           // const 128 for version 1.0
    U32 NestingLevel;           // deepest level = 1
    U32 NumEntries;             // number of payloads described
    U32 TOC_CRC;                // CRC computed over entire TOC
    U32 Description[80];        // any contents, Pad with NUL.
};
```

Because compilers can pad in different ways, a more strict view of the format of a header is provided below, drawn similarly to big-endian memory-mapped register definitions.
ci_header memory map

| Byte Offset | 0 | 1 | 2 | 3 |
|---|---|---|---|---|
| 0 | Signature (16 bytes) | | | |
| 4 | | | | |
| 8 | | | | |
| 12 | | | | |

-continued

| Byte Offset | 0 | 1 | 2 | 3 |
|---|---|---|---|---|
| 16 | Version (16 bytes) | | | |
| 20 | | | | |
| 24 | | | | |
| 28 | | | | |
| 32 | HeaderLength = 128 for CI version 1.0 | | | |
| 36 | NestingLevel | | | |
| 40 | NumEntries | | | |
| 44 | TOC_CRC | | | |
| 48 | Description (80 bytes) | | | |
| 52 | | | | |
| 56 | | | | |
| 60 | | | | |
| 64 | | | | |
| 68 | | | | |
| 72 | | | | |
| 76 | | | | |
| 80 | | | | |
| 84 | | | | |
| 88 | | | | |
| 92 | | | | |
| 96 | | | | |
| 100 | | | | |
| 104 | | | | |
| 108 | | | | |
| 112 | | | | |
| 116 | | | | |
| 120 | | | | |
| 124 | | | | |

In order to support composite images that are native ROM image formats the location of the table of contents (TOC) cannot be fixed. Such generality demands that it must be possible to place it at the end of the ROM image (as done with SEP ROM format), at the beginning of the ROM or most any offset in between. Furthermore, since the system supports compositions of compositions, there can be more than one TOC located anywhere within the file image. Consequently, firmware (or software) that decomposes these images can make no assumptions about the location of a TOC.

The signature field is a unique sequence of bits that is used by firmware (or software) to locate every table of contents within an image file. The signature is the first field of a TOC and has a fixed length (16 bytes) and a fixed value. The value of the signature is a GUID generated with the Microsoft guidgen.exe tool. It is shown below in two forms: one in C-source code as is typical for software using GUIDs which assume little-endian storage and in big-endian memory map format which is the format of the CI data structures, and endian-neutral C code.

```
Signature GUID in Little-Endian C
    // {BD4DF70F-E891-4acd-BD8C-B15209D1E671}
    static const GUID CI_SIGNATURE =
        {0xbd4df70f, 0xe891, 0x4acd,
            {0xbd, 0x8c, 0xb1, 0x52, 0x9, 0xd1, 0xe6, 0x71}
        };
```

Signature GUID in Big-Endian Memory Map

| Byte Offset | 0 | 1 | 2 | 3 |
|---|---|---|---|---|
| 0 | 0x0F | 0xF7 | 0x4D | 0xBD |
| 4 | 0x91 | 0xE8 | 0xCD | 0x4A |
| 8 | 0xBD | 0x8C | 0xB1 | 0x52 |
| 12 | 0x09 | 0xD1 | 0xE6 | 0x71 |

```
Signature GUID in Endian-Neutral C
    static const U8 CI_SIGNATURE[16] =
        {0x0f, 0xf7, 0x4d, 0xbd, 0x91, 0xe8, 0xcd, 0x4a,
         0xbd, 0x8c, 0xb1, 0x52, 0x09, 0xd1, 0xe6, 0x71};
```

The version field specifies the numeric version of this specification to which the composite image conforms. It is expected that this value rarely need to change but it is necessary to support evolution of the specification. It also allows the specification to evolve independently of released composites so that any backwards compatible firmware can be composed with older composite images. The composite image version stored in ASCII, NUL-terminated string format "% d. % d". The numbers are decimal, with no leading zeros. Unused (trailing) bytes of the string are filled with NUL (0x00) bytes. This 16-byte field is longer than actually required, but is formatted identical to the entry version field for compatibility.

The headlength field is included to satisfy behavioral requirement BR 10 mixed version Images. It supports mixed version aggregations that can be partially parsed by older version parsers. The main requirement is to support extraction, by an older version parser of an older image that was aggregated with newer images by a newer version composer. The older parser will be able to locate the first directory entry of any table of contents and using the EntryLength field, search its TOC for any entry that it might recognize. This field (and EntryLength in the entry structure) was introduced in order to avoid the compromise and arbitrary choice of padding the header (and entry) structure with reserved fields. This mechanism is more open and more general and is consistent with constraint requirement CR 2 Self-Describing Format. This must be 128 (0x80) for images conforming to version 1.0 of the specification.

The NestingLevel field specifies the 'nesting' level of composite images that have been created by composing other composite images. A composite of only payloads (having no CI TOC present) is defined as a Level 1 composite image and the value of this field will be 0x00000001. The value of Level for a composite image that contains one or more composite images as a payload is one higher than the highest Level of the contained images. For example if a composite image is built using two composite images whose Levels are 1 and 2, the new composite Level will be 3. If both composite images are Level 1 images, then a composite image that contains these two will be a Level 2 image. The purpose of Nesting Leveling field in multi-composite images is to allow recovery of the container hierarchy from the single file. One important use case that needs hierarchy to be understood is for an update tool which provides an "image inventory" capability for the end user. Since updates should be as simple as possible for the customer, a composite image with a validated aggregation of firmware update image payloads is created and the customer doesn't need to worry about or manage the multiple binaries necessary for a complete aggregation. However, some error may occur that necessitates inventory of the firmware composite, and this mechanism allows a single tool to be written that can inventory arbitrary composite images—having no a priori knowledge of them—to be deployed and used. The size of the level field may be an unsigned 32 bit integer.

The Number of entries (NumEntries) field may be a 32 bit unsigned integer to specify the number of entries in the table of contents of a composite image, including the entry for the composite image itself. Thus the smallest value this field may hold is 1. Typically it will have the value 2 or more. All entries are assumed to be valid and to specify a payload within the composition at the level of aggregation specified by the level field. Since a payload may itself be a composite image (each having its own TOC), there may be more actual payloads within the file than specified by any one TOC.

The TOC_CRC field value is computed over all of (but only) the bytes in the complete table of contents with this field pre-set to 0xFFFFFFFF. The TOC-CRC field value is overwritten after computing the CRC. The CRC employed is CRC-32-IEEE, which is used for Ethernet, FDDI, ZIP and other archive formats whose normal (big-endian) polynomial is 0x04C11DB7. This CRC is the one used in both the SEP firmware and the RAID controller firmware. The appendix contains a big-endian, byte wise implementation of the CRC algorithm, extracted from the controller source code as an example implementation.

The description field exists to pad the header to be the same size as an entry. Its current contents is not specified at this time other the following. It may contain a single, NUL-terminated ASCII string beginning at the first byte of the field. All unused bytes following the terminating NUL shall also be filled with NUL characters (0x00). It is assumed that this string will be seen by customers so its contents must conform to company standards governing such data. For example, no project code names may be contained in this string in released firmware images (codenames may be useful for pre-released or bootleg firmware for tracking and debug). It may be useful to include information such as the date the composite image was built and the name and version of the application that composed it.

The entry field describes a payload. The first entry is port of the TOC and describes the entire composite image which itself is a type of payload. The CRC of the first entry therefore, is computed over every byte in the composite image. The CRC of other entries is computed only over the bytes within the payload pointed to by the entry. A C-language representation of the entry field is provided below.

```
ci_entry in C
    struct ci_entry {
        U32    EntryLength;      // const 128 for CI Version 1.0
        U32    PayloadTag;
        U32    DataFormat;
        U32    PayloadCRC;
        U32    PayloadLength;
        S32    PayloadOffset;    // Note: negative offset is valid.
        U8     PayloadVersion[16];
        U8     Description[88];  // EntryLength = 128
    };
``` ci_entry memory map

| Byte Offset | 0 | 1 | 2 | 3 |
|---|---|---|---|---|
| 0 | EntryLength = 128 for version 1.0 of CI ||||
| 4 | PayloadTag ||||
| 8 | DataFormat ||||
| 12 | PayloadCRC ||||
| 16 | PayloadLength ||||
| 20 | PayloadOffset ||||
| 24 | Version (16 bytes) ||||
| 28 | |||| 
| 32 | |||| 
| 36 | |||| 
| 40 | Description/Padding (88 bytes) ||||
| 44 | |||| 
| 48 | |||| 
| 52 | |||| 
| 56 | |||| 
| 60 | |||| 
| 64 | |||| 
| 68 | |||| 
| 72 | |||| 
| 76 | |||| 
| 80 | |||| 
| 84 | |||| 
| 88 | |||| 
| 92 | |||| 
| 96 | |||| 
| 100 | |||| 
| 104 | |||| 
| 108 | |||| 
| 112 | |||| 
| 116 | |||| 
| 120 | |||| 
| 124 | ||||

The EntryLength field is included to satisfy behavioral requirement BR 10 Mixed Version Images. It supports mixed version aggregations that can be partially parsed by older version parsers. The main requirement is to support extraction, by an older version parser of an older image that was aggregated with newer images by a newer version composer. The older parser will be able to locate the first directory entry of any table of contents by adding HeaderLength to the offset of the first byte of the TOC and then using the EntryLength field, search its TOC for any entry that it might recognize. This field (and HeaderLength in the CI Header structure) were introduced in order to avoid the compromise and arbitrary choice of padding the entry (and header) structure with reserved fields. This mechanism is more open and more general and is consistent with constraint requirement CR 2 Self-Describing Format. In at least some embodiments, the EntryLength field may be set to 128 (0x80) for images using version 1.0 of the specification.

The PayloadTag field is a payload specific identifier used to communicate between the build-time software that creates (and composes) the payload and the runtime firmware that consumes the image. That is, the value is agreed upon between the entity that creates the format value and the entity that consumes the value. This value should always be semantically opaque to the firmware update tools. It is syntactically visible due to its visibility in the descriptor and can be displayed in inventories, but software should never encode a dependency on meaning for particular values of PayloadTag. Doing so would hinder development of new firmware payloads which necessitated redefinition of PayloadTag values for that firmware product. Therefore, new format values are defined by the producer/consumer of the value and these values and their payload-specific meanings should be published in the functional specification for that firmware component. PayloadTag may be a 32 bit unsigned integer, stored in big-endian format.

The DataFormat field identifies the data encoding format of the payload that the entry describes. Various values for this field are defined herein. If new values are required, an updated version of the composite image framework will be released and its version number incremented. DataFormat is a 32-bit unsigned integer, stored in big-endian format. DataFormat values for version 1.0 of the Composite Image specification are:
Valid Values for DataFormat

| Value | Data Format |
|---|---|
| 1 | Composite Image—Used only in TOC entry |
| 2 | Raw Binary |
| 3 | Motorola S record |
| 4 | Cypress PSOC |
| 0, 5-0xFFFFFFFF | Undefined (and reserved) |

The PayloadOffset field is the byte offset from the beginning of the TOC containing this entry to the first (lowest address) byte of the payload that this entry describes. Because a TOC may follow (be at a higher address offset within the file that contains) the payload which it describes, offsets may be negative. PayloadOffset may be a 32 bit unsigned integer, stored in big-endian format.

The PayloadLength field is the size of the payload in bytes. It is the number of bytes for which the CRC is calculated. PayloadLength may be a 32 bit unsigned integer, stored in big-endian format. Because a TOC may follow a payload, the largest size payload that can be described is about 2 G.

The PayloadCRC field is computed over all of (but only) the bytes in the payload that this entry describes. The CRC employed is CRC-32-IEEE, which is used for Ethernet, FDDI, ZIP and other archive formats whose normal (big-endian) polynomial is 0x04C11DB7. This CRC is the one used in both the SEP firmware and the RAID controller firmware. The appendix contains a big-endian, byte wise implementation of the CRC algorithm, extracted from the controller source code as an example implementation.

The Payload Version field is stored in ASCII, NUL-terminated string format "% s". Unused (trailing) bytes of the string are filled with NUL (0x00) bytes.

The description field is a customer readable description of the firmware payload that an entry describes. Its contents must conform to company standards governing such data. For example, program code names cannot be used in this string in release candidate or released firmware images. Codenames may be useful for pre-released or bootleg firmware for tracking and debug.

The TOC is basically the header structure concatenated with the first Entry of the directory. The set of Entries in the TOC may be referred to as the directory and is an array of entries. The first entry always describes the entire composite image—a self describing payload. The second entry describes a payload in the composite; the third entry describes another payload and so on. A well-formed composite image always contains exactly one directory entry for every payload. Since the first entry describes the whole composite, an empty composite image is well formed because the only entry that must exist describes the composite which contains only the TOC. A pseudo C-language representation of the TOC of a Composite Image is shown below:

```
ci_entry in C
    struct ci_toc {
        struct ci_header    header;
        struct ci_entry entries[*];    // must contain at least one
                                       //entry.
    };
                                       // entries follow contiguously
```

Because the first directory entry is a self-referential entry that describes the whole composite image, any useful firmware image stored in this format will contain a minimum of 2 entries—one for the TOC and one for a single payload.

A pseudo C-language representation of two different Composite Image files is shown below:

```
ci_image in C
    struct ci_image {
        struct ci_toctoc;     // very first bytes of the file
        U8 payload[*];        // 0 or more bytes of payload data
    };
    struct ci_image {
        U8 payload[*];        // 0 or more bytes of payload data
        struct ci_toctoc;     // aligned on 1024-byte file offset
    };
```

Since a payload may contain one or more individual composite images, there can be more than one TOC within the image. However, there is only one TOC for each image, and images (and TOCs) do not intersect in well-formed composite images.

Various composition rules may be applied when building a composite image. For example, an entry in the TOC always describes one and only one payload within the composition at the same level of the entry. Further, all entries in the TOC exist within the same nesting level. Entries cannot span nesting levels. In other words, all payloads in a composite image are members of the same set and all composite images within a composite image do not intersect with peers and are in a strict set-subset hierarchical relationship with non-peer images. Further, the PayloadCRC of the first Entry (that describes the payload of the whole CI) must be calculated over all data in the image EXCEPT the TOC itself. Further, all of the entries and their CRCs must be computed and filled in before the TOC_CRC is calculated. Further, the TOC_CRC must be calculated and filled in last. Further, when calculating the TOC_CRC, the field that holds the TOC_CRC shall be set to 0xFFFFFFFF prior to beginning this calculation. Further, the CRC algorithm documented in appendix B shall be used for all CRC calculations.

Various decomposition rules may be applied when unpacking or decomposing a composite image. For example, decomposition of a file shall be a read-only process—the image must not be modified in any way as a result of decomposition. Although modifying an image is not permitted, decomposing an image and constructing another identical or different image from its components is permitted. However, this should be done in a way that does not modify the input image. Further, when validating the TOC_CRC, the algorithm must be written to compute the CRC of the TOC as if the TOC_CRC field in the Header held the value 0xFFFFFFFF, then the comparison against the actual TOC_CRC value may be performed. Further, no assumption about where in the image the TOC resides may be made by decomposition software other than the TOC must always reside on a 1024 byte aligned address offset from the beginning of the image. Further, because composite images may contain nested composite images, and such images may end up being a multiple of 1024 bytes in size, it is possible that more than one (maybe many) signatures will be discovered on a 1024 byte offset. Therefore, it is required that the entire image be scanned for signatures at every 1024 byte offset until the highest level TOC is located. That TOC is the outermost TOC. Further, because nested images may not be 1024 byte multiples in length, there may exist TOCs whose signatures do not fall on 1024 byte offsets. These TOCs are always going to belong to inferior (nested) composite images which must be extracted as payloads and then scanned at 1024 byte offsets for other nested TOCs. This process must continue until Composite Image Level 1 is located. Further, if the payload bytes are exhausted before level 1 TOC is encountered, the image is ill-formed and should not be trusted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
    a processor;
    a memory coupled to said processor; and
    a network interface coupled to the processor,
    wherein the memory stores a firmware composition tool that, when executed by the processor, is to build a composite image comprising an arbitrary number of firmware update images according to a set of format rules that enables a self-describing aggregation of the arbitrary number of firmware update images, all of the firmware update images within the composite image being at a same nesting level, and a single table of contents comprising entries describing the firmware update images, all entries in the table of contents being at the same nesting level, wherein a first entry in the table of contents describes the entire composite image as a type of payload; and
    wherein the composite image outlines an order the arbitrary number of firmware update images should be implemented based on dependencies.

2. The computer system of claim 1, wherein the firmware composition tool is further to retrieve the arbitrary number of firmware update images from a database of firmware update images based on a product identifier.

3. The computer system of claim 1, wherein the composite image comprises at least one firmware image payload.

4. The computer system of claim 3, wherein the table of contents comprises a single header and at least one entry.

5. The computer system of claim 3, wherein the table of contents is aligned with the at least one firmware image payload at a predetermined byte-aligned offset.

6. The computer system of claim 4, wherein the header comprises a signature field, a CI version field, a header length field, a number of entries field, a nesting level field, a TOC_CRC field, and a description field.

7. The computer system of claim 4, wherein each entry comprises an entry length field, a payload tag field, a data format field, a payload CRC payload length field, a payload offset field, a payload version field, and a payload description field.

8. The computer system of claim 1, wherein the composite image comprises at least one nested composite image that is identified in a nesting level field of the table of contents.

9. The computer system of claim 1, wherein the table of contents has a single header, the header is a container having one of each of a signature, a composite image version, a header length, a number of entries, a nesting level, a table of contents (TOC)_CRC (Table of Contents Cyclic Redundancy Check) field, and a description field, and wherein together the header and a first entry in the table of contents describes the entire composite image as the payload type.

10. A computer system comprising:
    a processor;
    a memory coupled to said processor; and
    a network interface coupled to the processor,
    wherein the memory stores a firmware decomposition tool that, when executed by the processor, is to decompose a composite image according to a set of format rules that interprets the composite image as a self-describing aggregation of a random number of firmware update images, all of the firmware update images being at a same nesting level;
    wherein the composite image comprising a single table of contents, the table of contents position-independent within the composite image, and the table of contents comprising entries describing the firmware update images, all entries in the table of contents being at the same nesting level; and
    wherein the composite image outlines an order the arbitrary number of firmware update images should be implemented based on dependencies.

11. The computer system of claim 10, wherein the firmware decomposition tool is to interpret the composite image as having at least one firmware image payload.

12. The computer system of claim 11, wherein the firmware decomposition tool is to interpret the table of contents as having a single header and at least one entry, and wherein the firmware decomposition tool interprets the single header as having a signature field, a CI version field, a header length field, a number of entries field, a nesting level field, a TOC_CRC field, and a description field.

13. The computer system of claim 11, wherein the firmware decomposition tool is to interpret the table of contents as having a single header and at least one entry, and wherein the firmware decomposition tool interprets each entry as having an entry length field, a payload tag field, a data format field, a payload CRC payload length field, a payload offset field, a payload version field, and a payload description field.

14. The computer system of claim 11, wherein the firmware decomposition tool is to interpret the table of contents as having a single header and at least one entry, and wherein the firmware decomposition tool interprets a first entry following the header as describing the entire composite image.

15. The computer system of claim 11, wherein the firmware decomposition tool is to interpret the composite image as having nesting level field that identifies a number of nested composite images in the composite image.

16. A method comprising:
    accessing, by a computer system, a set of composite image format rules to support a self-describing aggregation of a random number of firmware update image payloads, wherein the composite image outlines an order the arbitrary number of firmware update images should be flashed based on dependencies and comprises a single table of contents in which all entries in the single table of contents are at a same nesting level, wherein a first entry in the table of contents describes the entire composite image as a type of payload;
    applying the set of composite image format rules to a set of firmware update image payloads, wherein the composite image outlines an order the arbitrary number of firmware update images should be implemented based on dependencies.

17. The method of claim 16, wherein said applying the set of composite image format rules is performed to compose a composite image having the set of firmware update image payloads.

18. The method of claim 17, wherein the table of contents identifies each firmware update image payload in the set of firmware update image payloads.

19. The method of claim 16, wherein said applying the set of composite image format rules is performed to decompose a composite image having the set of firmware update image payloads.

20. The method of claim 19, wherein the table of contents identifies each firmware update image payload in the set of firmware update image payloads.

\* \* \* \* \*

UNITED STATES PATENT AND TRADEMARK OFFICE
CERTIFICATE OF CORRECTION

PATENT NO. : 8,984,502 B2  
APPLICATION NO. : 13/284640  
DATED : March 17, 2015  
INVENTOR(S) : Bradley Culter Page 1 of 1

It is certified that error appears in the above-identified patent and that said Letters Patent is hereby corrected as shown below:

In the Drawings

In sheet 5 of 6, reference numeral 604, line 8, delete "AGGEGREGATION" and insert -- AGGREGATION --, therefor.

Signed and Sealed this  
Twenty-eighth Day of July, 2015

Michelle K. Lee  
*Director of the United States Patent and Trademark Office*